(12) United States Patent
Beall et al.

(10) Patent No.: US 11,722,033 B2
(45) Date of Patent: Aug. 8, 2023

(54) ELECTRIC MOTOR WITH BACKUP BEARING ASSEMBLY

(71) Applicant: Bell Textron Inc., Fort Worth, TX (US)

(72) Inventors: Grant Michael Beall, Plano, TX (US); Michael Raymond Hull, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 17/410,519

(22) Filed: Aug. 24, 2021

(65) Prior Publication Data
US 2023/0061193 A1    Mar. 2, 2023

(51) Int. Cl.
*H05K 7/08*  (2006.01)
*H02K 7/08*  (2006.01)
*F16C 35/063*  (2006.01)

(52) U.S. Cl.
CPC .......... *H02K 7/088* (2013.01); *F16C 35/063* (2013.01); *F16C 2380/26* (2013.01); *H02K 2213/06* (2013.01)

(58) Field of Classification Search
CPC .......... H02K 5/00; H02K 5/17; H02K 5/1732; H02K 7/00; H02K 7/09; F16C 32/00; F16C 32/04; F16C 32/044; F16C 32/0442; F16C 32/047; F16C 39/00; F16C 39/02
See application file for complete search history.

(56) References Cited

U.S. PATENT DOCUMENTS

| | | | |
|---|---|---|---|
| 5,914,547 A | 6/1999 | Barahia et al. | |
| 7,800,263 B2 * | 9/2010 | Horng | H02K 11/33 |
| | | | 310/90 |
| 8,415,847 B2 | 4/2013 | Singhal et al. | |
| 2010/0164313 A1 * | 7/2010 | Langford | H02K 21/24 |
| | | | 310/90 |

FOREIGN PATENT DOCUMENTS

| | | | | |
|---|---|---|---|---|
| CN | 204900587 | * | 12/2015 | |
| ES | 2647565 T3 | | 12/2017 | |
| RU | 2574296 C2 | | 6/2014 | |
| WO | WO2016063248 | * | 4/2016 | ............... F16D 9/08 |

* cited by examiner

*Primary Examiner* — Tran N Nguyen
(74) *Attorney, Agent, or Firm* — Bradley Arant Boult Cummings LLP

(57) ABSTRACT

An electric motor adapted to apply torque to a drive shaft rotatable about an axis, the electric motor includes a stator, a rotor adapted to rotate relative to the stator, a primary bearing interoperably coupled to the stator and adapted to provide bearing support between the stator and the rotor, an auxiliary bearing interoperably coupled to the drive shaft, an annular shear adapter connected to the primary bearing and the auxiliary bearing, and a shear pin interoperably coupled to the primary bearing via the annular shear adapter and configured to break responsive to torque between the annular shear adapter and the drive shaft exceeding a predetermined torque threshold.

15 Claims, 4 Drawing Sheets

ELECTRIC MOTOR WITH BACKUP BEARING ASSEMBLY

TECHNICAL FIELD

The present disclosure relates generally to electric motors and more particularly, but not by way of limitation, to electric motors that employ a backup bearing that is activated in the event of a failure of a primary bearing or other component of the electric motor.

BACKGROUND

This section provides background information to facilitate a better understanding of the various aspects of the disclosure. It should be understood that the statements in this section of this document are to be read in this light and not as admissions of prior art.

Electrically powered rotorcraft use electric motors to power rotors or fans for propulsion. In some electric rotorcraft, electric motors are stacked in series on a common shaft and directly drive a rotor, fan, or gearbox of the electric rotorcraft. For certification of some electric rotorcraft, a motor system must accommodate a failure such as a jam, binding, or other degradation of performance of a component (e.g., a bearing) of the electric motor and still allow other electric motors and drivetrain components to operate. In the past, this objective has been accomplished by integration of a clutch such as, for example, a sprag clutch or other mechanism into each motor. However, such mechanisms can increase cost and weight, as well as consume significant valuable space within the motor system.

SUMMARY

This summary is provided to introduce a selection of concepts that are further described below in the detailed description. This summary is not necessarily intended to identify key or essential features of the claimed subject matter, nor is it intended to be used as an aid in limiting the scope of claimed subject matter.

An electric motor adapted to apply torque to a drive shaft rotatable about an axis, the electric motor includes a stator, a rotor adapted to rotate relative to the stator, a primary bearing interoperably coupled to the stator and adapted to provide bearing support between the stator and the rotor, an auxiliary bearing interoperably coupled to the drive shaft, an annular shear adapter connected to the primary bearing and the auxiliary bearing, and a shear pin interoperably coupled to the primary bearing via the annular shear adapter and configured to break responsive to torque between the annular shear adapter and the drive shaft exceeding a predetermined torque threshold.

An electric drive system operable to drive a common drive shaft rotatable about an axis includes a plurality of electric motors arranged in series along the common drive shaft. Each of the plurality of electric motors includes a stator, a rotor adapted to rotate relative to the stator, a primary bearing interoperably coupled to the stator and adapted to provide bearing support between the stator and the rotor, an auxiliary bearing interoperably coupled to the common drive shaft, an annular shear adapter connected to the primary bearing and the auxiliary bearing, and a shear pin interoperably coupled to the primary bearing via the annular shear adapter and the common drive shaft and configured to interoperably decouple the primary bearing from the common drive shaft responsive to a failure of a component of the electric motor.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Various embodiments will now be described more fully with reference to the accompanying drawings. The disclosure may, however, be embodied in many different forms and should not be construed as limited to the embodiments set forth herein.

In a typical embodiment, an electric motor is disposed around a drive shaft and includes a primary bearing and an auxiliary bearing adapted to permit rotation of the drive shaft in the event of a failure of the primary bearing. The auxiliary bearing may be, for example, a ball bearing or a low-friction raceway. The auxiliary bearing is, in a typical embodiment, activated via failure of one or more shear pins. Failure of the one or more shear pins occurs responsive to torque applied to the one or more shear pins exceeding a predetermined torque threshold. The bearings may be arranged axially or radially via a shear adapter in order to make efficient use of volume within the electric motor. In many cases, the auxiliary bearing will be designed to have a limited life relative to the primary bearing in order to save on one or both of cost and space. In some embodiments, an electrical circuit is activated by a shear-pin failure. Activation of the electrical circuit may serve to notify one or both of a flight control computer ("FCC") or rotorcraft personnel. Arrangements as set forth herein permit a failure-resistant electric motor to be achieved while avoiding cost, weight, and space constraints of clutch systems previously employed.

Figure 1:
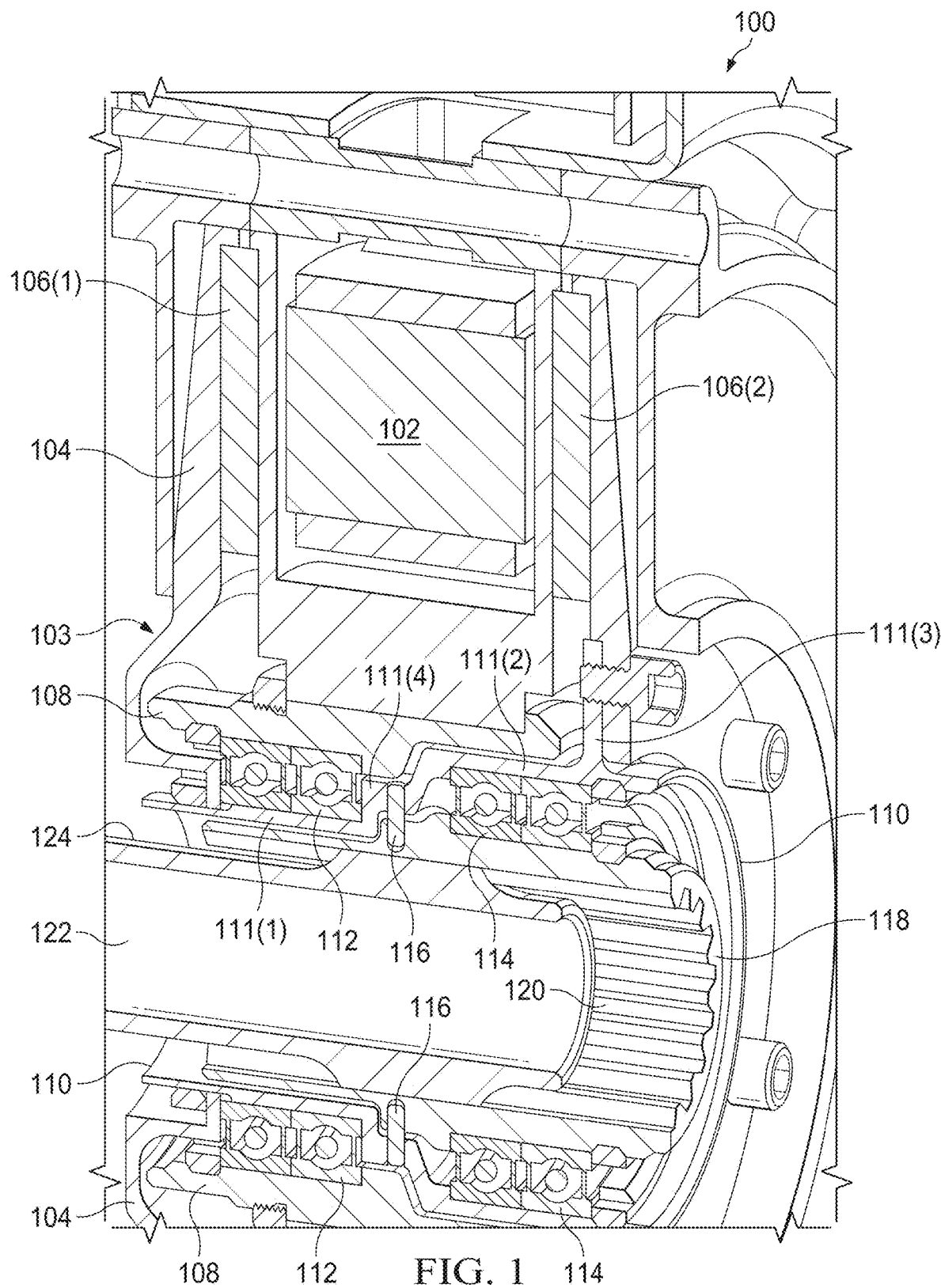
FIG. 1 is a perspective cross-sectional view of an electric motor.

FIG. 1 is a perspective cross-sectional view of an electric motor 100. The electric motor 100 includes a stator 102, a rotor 103 including a rotor carrier 104 and rotor magnets 106(1) and 106(2), a motor hub 108, a shear adapter 110, a primary bearing 112, an auxiliary bearing 114, a shear pin 116, and a drive hub 118. The stator 102 is fixedly connected to the motor hub 108. The primary bearing 112, which is shown solely for illustrative purposes as a duplex bearing, couples the motor hub 108 to the shear adapter 110. As illustrated in FIG. 1, the shear adapter 110 is an annular member that includes a first axial portion 111(1), a second axial portion 111(2), a radial arm 111(3) that is fixed to the rotor carrier 104, and a connecting portion 111(4) that joins the first axial portion 111(1) and the second axial portion 111(2). The shear pin 116 is connected between the connecting portion 111(4) and the drive hub 118. The first axial portion 111(1) is connected between the motor hub 108 and the primary bearing 112, while the second axial portion 111(2) is connected between the rotor carrier 104 and the drive hub 118. A radius of the first axial portion 111(1) is less than a radius of the second radial portion 111(2).

The primary bearing 112 and the auxiliary bearing 114 need not be identical. Either or both of the primary bearing 112 and the auxiliary bearing 113 may, for example, be ball bearings, roller bearings, raceways, or other low-friction mechanisms. For example, the auxiliary bearing 113 may be a radially spaced auxiliary low-friction surface. In typical embodiments, the auxiliary bearing 114 is a lighter-duty bearing than the primary bearing 112. This is because, in such typical embodiments, the auxiliary bearing 114 serves as a backup bearing to in effect isolate the electric motor 100 from the drive shaft 122 in the event of a failure of the primary bearing 112 or another component of the electric motor 100.

The motor hub 108 is stationary and the shear adapter 110 is rotating during normal operation of the electric motor 100. Normal operation means that the electric motor 100 is operating within design parameters. The shear pin 116 connects the shear adapter 110 and the drive hub 118, both of which rotate together during normal operation of the electric motor 100. An interior surface 120 of the drive hub 118 is fixedly connected to an outer surface 124 of a drive shaft 122 via a splined connection such that the drive hub 118 and the drive shaft 122 rotate together.

In normal operation of the electric motor 100, the rotor 103, including the rotor carrier 104 and the rotor magnets 106(1) and 106(2), rotates relative to the stator 102 around an axis of the drive shaft 122. Responsive to rotation of the rotor 103, the shear adapter 110 rotates around the axis. Rotation of the shear adapter 110 causes the drive hub 118 to rotate about the axis via a fixed connection between the drive hub 118 and the shear adapter 110 by the shear pin 116. In contrast, in normal operation, the stator 102 and the motor hub 108 are stationary. The primary bearing 112 provides bearing support between the rotating shear adapter 110 and the stationary motor hub 108. The auxiliary bearing 114 is connected between rotating shear adapter 110 and the drive hub 118, both of which rotate about the axis during normal operation of the electric motor 100. The auxiliary bearing 114 is thus positioned between two rotating elements during normal operation of the electric motor 100, which is in contrast to the primary bearing 112, which provides bearing support between a rotating component and a stationary component during normal operation of the electric motor 100.

In the event of a failure or other degradation of performance of the primary bearing 112 or other component of the electric motor 100, a predetermined torque threshold may be exceeded. If the predetermined torque threshold is exceeded, the shear pin 116 will break. Breakage of the shear pin 116 causes a disconnection between the shear adapter 110 and the drive hub 118. The predetermined torque threshold would typically be exceeded when a plurality of electric motors 100 are each driving the drive shaft 122 and one of the electric motors 100 seizes and one or more remaining electric motors 100 continue to attempt to drive the drive shaft 122. Such a failure is an example of the electric motor not operating normally. In a typical embodiment, the shear pin 116 is configured operate up to a worst-case operational torque plus a safety margin and to break under, for example, an instantaneous lockup in response to which one or more electric motors are driving against the lockup. Moreover, in a typical embodiment, load inertia would cause a large spike in torque experienced by the shear pin 116.

Responsive to disconnection of the shear adapter 110 from the drive hub 118: 1) torque applied by the motor 100 is no longer supplied through the drive hub 118 to the drive shaft 122; and 2) the drive hub 118 freewheels relative to the shear adapter 110, the auxiliary bearing 114 providing bearing support between the shear adapter 110, which is either not rotating or providing more than an amount of rotational resistance present under normal operational conditions, and the drive hub 118. Thus, in response to failure of a component of the electric motor 100, such as, for example, the primary bearing 112, the auxiliary bearing allows the drive shaft 122 to continue to rotate (i.e., freewheel) in spite of the failure. In a typical embodiment, in the event of a failure, the auxiliary bearing 114 allows the drive shaft 122 to continue to rotate independently of any failed components of the electric motor 100.

Figure 2:
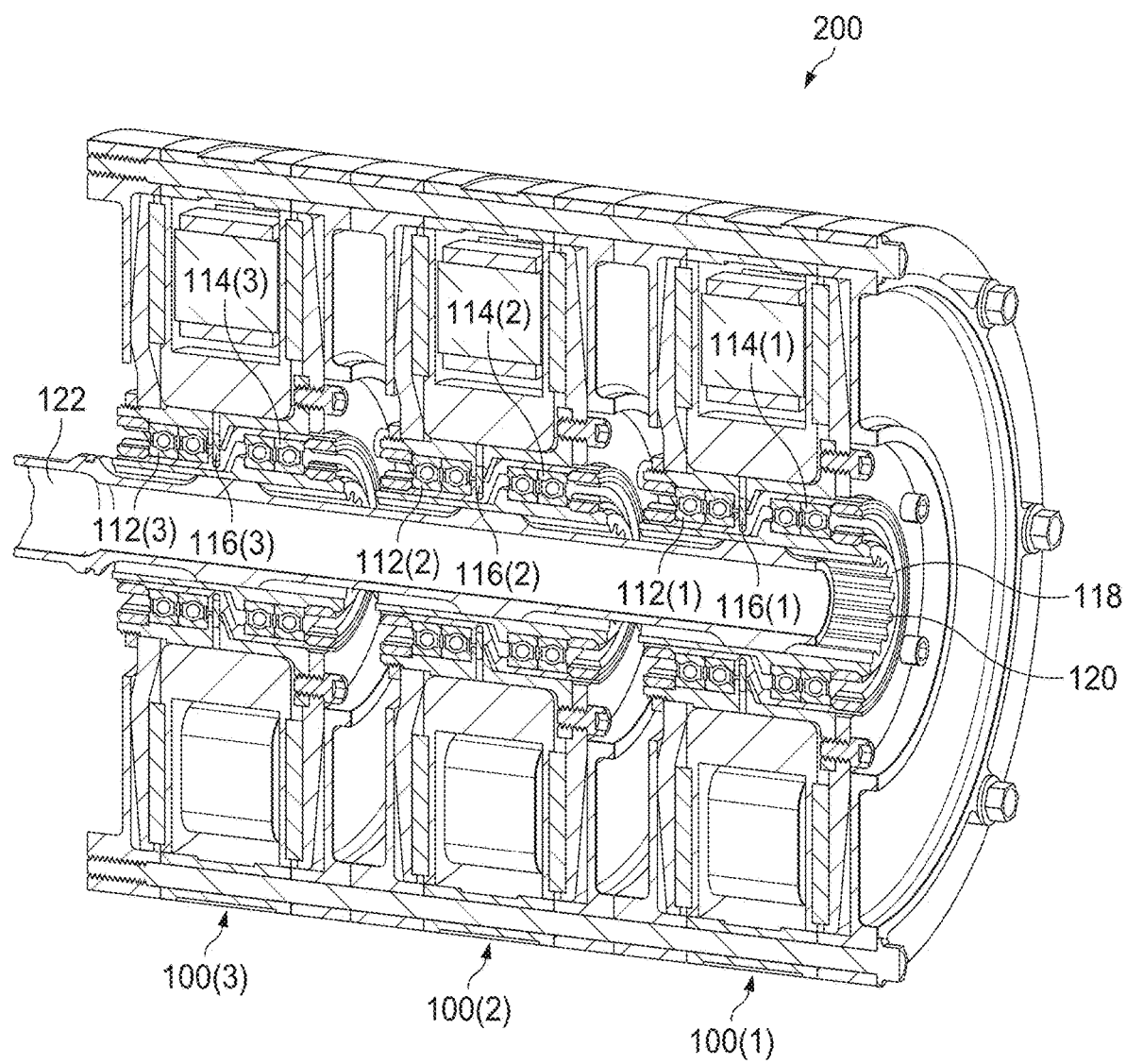
FIG. 2 is a perspective cross-sectional view of an electric-motor system that includes a plurality of the electric motor illustrated in FIG. 1.

FIG. 2 is a perspective cross-sectional view of an electric-motor system that includes a plurality of the electric motor 100 illustrated in FIG. 1. The electric-motor system 200 includes electric motors 100(1), 100(2), and 100(3) arranged in series along the drive shaft 122. Those having skill in the art will appreciate that a plurality of motors other than the three illustrated may be utilized. For purposes of clarity, not all components of the electric motors 100(1), 100(2), and 100(3) shown in FIG. 1 are labeled in FIG. 2. Operation of each of the electric motors 100(1), 100(2), and 100(3) is the same as discussed above relative to electric motor 100 and show in FIG. 1. Therefore, in the event of a failure or other degradation of performance of one of a primary bearing 112(1), 112(2), or 112(3), or other component of one of the electric motors 100(1), 100(2), and 100(3) that is sufficient to generate sufficient torque to cause a corresponding shear pin 116(1), 116(2), or 116(3) to break, breakage of the shear pin 116(1), 116(2), or 116(3) causes a disconnection between the shear adapter 110 and the drive hub 118. Sufficient torque to cause breakage of a shear pin would typically be due to one or more of the electric motors 100(1), 100(2), and 100(3) continuing to drive the drive shaft 122 following failure of a component of one of the electric motors 100(1), 100(2), and 100(3). Thus, in similar fashion to the discussion above relative to FIG. 1, failure of one of the primary bearings 112(1), 112(2), or 112(3) does not prevent remaining ones of the electric motors 100(1), 100(2), and 100(3) from supplying torque to the drive shaft 122 and the drive shaft 122 from rotating in response to the applied torque.

As noted with respect to FIG. 1, the primary bearings 112(1), 112(2), and 112(3) and the auxiliary bearings 114(1), 114(2), and 114(3) need not be identical. Any of the primary bearings 112(1), 112(2), and 112(3) and the auxiliary bearings 114(1), 114(2), and 114(3) may, for example, be ball bearings, roller bearings, raceways, or other low-friction mechanisms. In typical embodiments, the auxiliary bearings 114(1), 114(2), and 114(3) are lighter-duty bearings than the primary bearings 112(1), 112(2), and 112(3). This is because, in such typical embodiments, the auxiliary bearing 114(1), 114(2), and 114(3) serve as backup bearings in the event of a failure of the primary bearings 112(1), 112(2), or 112(3) or another component of the electric motors 100(1), 100(2), or 100(3).

Figure 3:
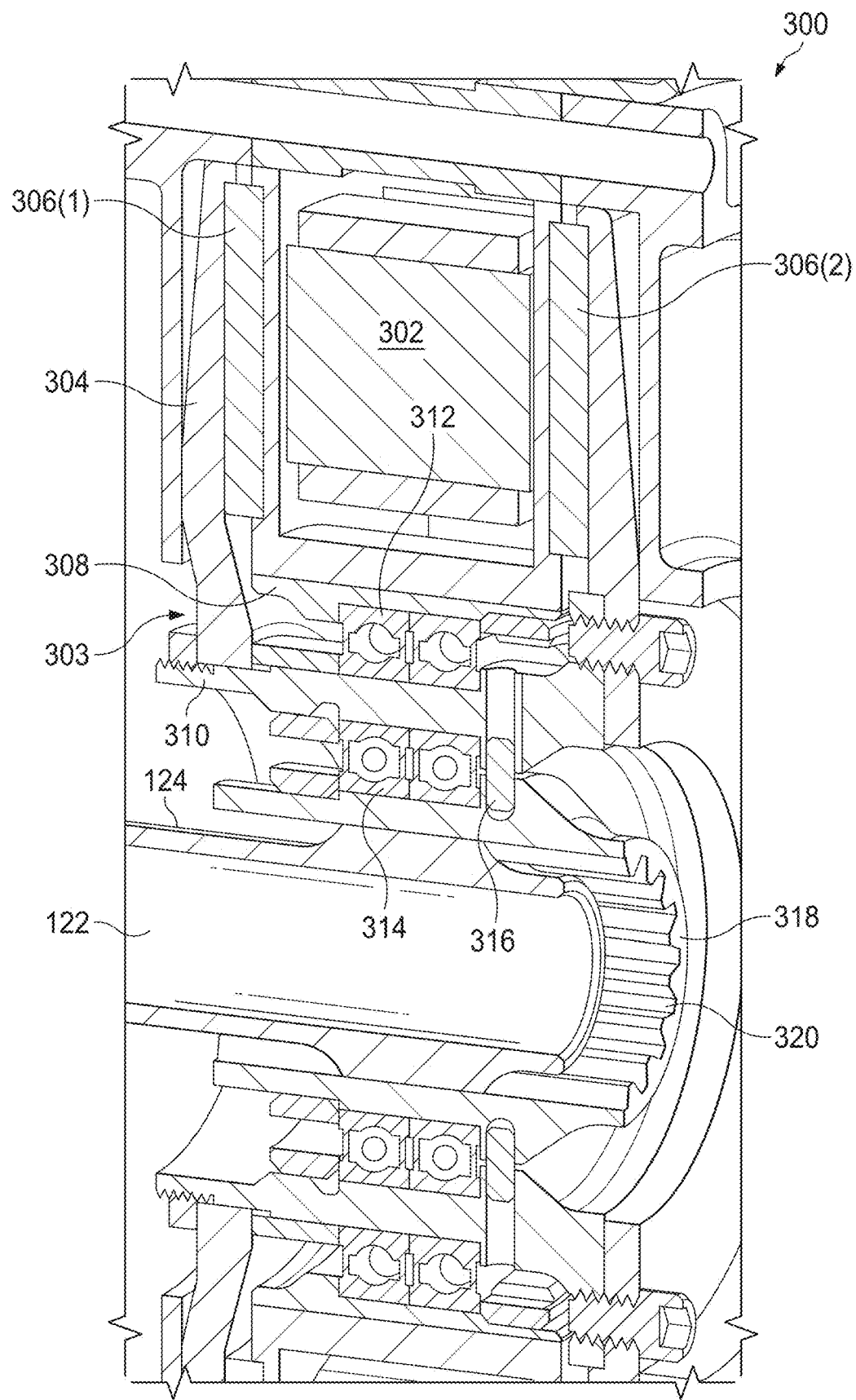
FIG. 3 is a perspective cross-sectional view of an electric motor that includes a primary bearing and an auxiliary bearing arranged radially relative to a drive shaft.

FIG. 3 is a perspective cross-sectional view of an electric motor that includes a primary bearing and an auxiliary bearing arranged radially relative to a drive shaft. The electric motor 300 includes a stator 302, a rotor 303 including a rotor carrier 304 and rotor magnets 306(1) and 306(2), a motor hub 308, a shear adapter 310, a primary bearing 312, an auxiliary bearing 314, a shear pin 316, and a drive hub 318. The stator 302 is fixedly connected to the motor hub 308. As illustrated in FIG. 3, the shear adapter 310 is an annular member that is connected radially between the primary bearing 312 and the auxiliary bearing 314. In similar fashion to FIG. 1, the shear adapter 310 is fixed to the rotor carrier 304. The primary bearing 312, which is shown solely for illustrative purposes as a duplex bearing, couples the motor hub 308 to the shear adapter 310. The primary bearing 312 and the auxiliary bearing 314 need not be identical. Either or both of the primary bearing 312 and the auxiliary bearing 113 may, for example, be ball bearings, roller bearings, raceways, or other low-friction mechanisms. For example, the auxiliary bearing 113 may be a radially spaced auxiliary low-friction surface. In typical embodiments, the auxiliary bearing 314 is a lighter-duty bearing than the primary bearing 312. This is because, in such typical embodiments, the auxiliary bearing 314 serves as a backup bearing in the event of a failure of the primary bearing 312 or another component of the electric motor 300.

The motor hub 308 is stationary and the shear adapter 310 is rotating during normal operation of the electric motor 300. The shear pin 316 connects the shear adapter 310 and the drive hub 318, both of which rotate during normal operation of the electric motor 300. An interior surface 320 of the drive hub 318 is fixedly connected to an outer surface 324 of a drive shaft 322 via a splined connection.

In normal operation of the electric motor 300, the rotor 303, including the rotor carrier 304 and the rotor magnets 306(1) and 306(2), rotates relative to the stator 302 around an axis of the drive shaft 322. Responsive to rotation of the rotor 303, the shear adapter 310 rotates around the axis. Rotation of the shear adapter 310 causes the drive hub 318 to rotate about the axis via a fixed connection between the drive hub 318 and the shear adapter 310 by the shear pin 316. In contrast, in normal operation, the stator 302 and the motor hub 308 are stationary. The primary bearing 312 serves to couple the rotating shear adapter 310 and the stationary motor hub 308. The auxiliary bearing 314 is connected between rotating shear adapter 310 and the drive hub 318, both of which rotate during normal operation of the electric motor 300. The auxiliary bearing 314 is thus positioned between two rotating elements during normal operation of the electric motor 300, which is in contrast to the primary bearing 312, which is positioned between a rotating component and a stationary component during normal operation of the electric motor 300.

In the event of a failure or other degradation of performance of the primary bearing 312 or other component of the electric motor 300 that is sufficient to generate sufficient torque to cause the shear pin 316 to break, breakage of the shear pin 316 causes a disconnection between the shear adapter 310 and the drive hub 318. Responsive to disconnection of the shear adapter 310 from the drive hub 318: 1) torque applied by the electric motor 300 is no longer supplied through the drive hub 318 to the drive shaft 322; and 2) the drive hub 318 freewheels relative to the shear adapter 310, the auxiliary bearing 314 providing a low-friction rotational connection between the shear adapter 310, which is either not rotating or providing more than an amount of rotational resistance present under normal operational conditions, and the drive hub 318. Thus, in response to failure of a component of the electric motor 300, such as, for example, the primary bearing 312, the auxiliary bearing allows the drive shaft 322 to continue to rotate in spite of the failure. A plurality of electric motors 300 can be arranged in series along an axis of the drive shaft 122 in similar fashion to that shown in FIG. 2.

Figure 4:
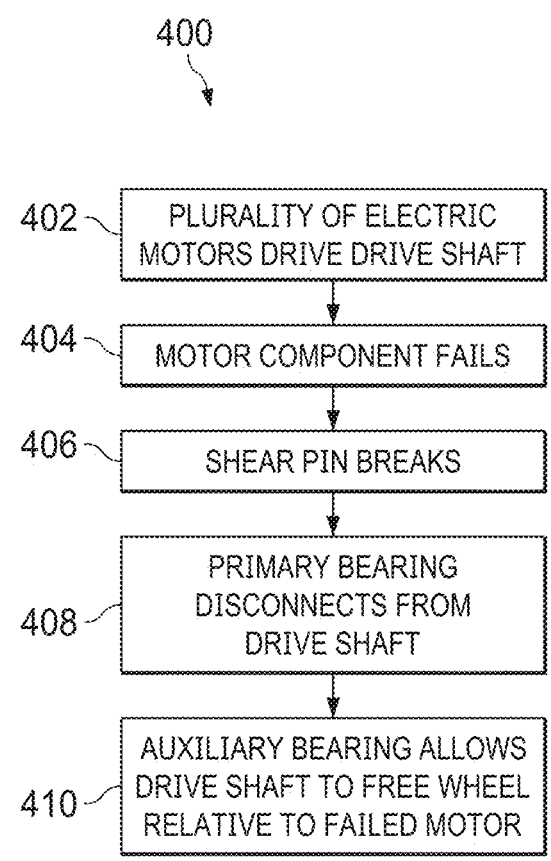
FIG. 4 is a flow chart that illustrates a process in the event of failure of a primary bearing or another component of an electric motor of an electrical-motor system.

FIG. 4 is a flow chart that illustrates a process in the event of failure of a primary bearing or another component of an electric motor of an electrical-motor system. A process 400 begins at step 402. At step 402, a plurality of electric motors such as, for example, the electric motor 100 or the electric motor 300, drive a drive shaft. During step 402, a primary bearing is interposed between rotating and stationary components of each of the electric motors and provides a low-friction interface between the stationary components and the rotating components.

From step 402, execution proceeds to step 404. At step 404, a component of one of the electric motors fails, meaning that the component seizes or otherwise has a degradation in performance such that a shear pin interoperably coupled to the primary bearing experiences sufficient torque to cause the shear pin to break. From step 404, execution proceeds to step 406.

At step 406, the shear pin breaks. As noted above, breakage of the shear pin is responsive to torque being applied to the shear pin above a predefined threshold. From step 406, execution proceeds to step 408. At step 408, by virtue of the shear pin having broken at step 406, the primary bearing is interoperably disconnected from the driveshaft such that rotating components of the electric motor are no longer rotationally coupled to the driveshaft. From step 408, execution proceeds to step 410. At step 410, an auxiliary bearing allows the driveshaft to freewheel relative to the electric motor that has failed, such behavior allowing other electric motors of the plurality of electric motors to drive the drive shaft without impediment due to the failed electric motor.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. For purposes of this patent application, the terms connected and connection require physical contact between components; in contrast, the term interoperably coupled does not necessarily require physical contact between components and may also encompass one or more intermediate components between components that are said to be interoperably coupled relative to one another.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. An electric motor comprising:
a stator fixedly connected to a motor hub;
a rotor including a rotor carrier and rotor magnets configured to rotate relative to the stator;
a drive shaft rotatable about an axis;
a shear adapter fixed to the rotor carrier and extending around a portion of the drive shaft;
a primary bearing providing bearing support between the shear adapter and the motor hub;
an auxiliary bearing providing bearing support between the shear adapter and the drive shaft; and
a shear pin fixedly interconnecting the drive shaft and the shear adapter, wherein breakage of the shear pin disconnects the rotor carrier and the shear adapter from the drive shaft allowing the drive shaft to freewheel relative to the rotor carrier and the shear adapter.

2. The electric motor of claim 1, wherein the primary bearing and the auxiliary bearing are arranged in series along the axis.

3. The electric motor of claim 1, wherein the primary bearing and the auxiliary bearing are arranged radially relative to the axis.

4. The electric motor of claim 1, wherein the primary bearing and the auxiliary bearing are identical.

5. The electric motor of claim 1, wherein the auxiliary bearing is less durable than the primary bearing.

6. The electric motor of claim 1, wherein the auxiliary bearing is selected from a ball bearing, a roller bearing, and a low-friction raceway.

7. An electric drive system comprising:
a common drive shaft rotatable about an axis;
a plurality of electric motors arranged in series along the common drive shaft, each of the plurality of electric motors comprising:
a stator fixedly connected to a motor hub;
a rotor including a rotor carrier and rotor magnets configured to rotate relative to the stator;
a shear adapter fixed to the rotor carrier and extending around at least a portion of the common drive shaft;
a primary bearing providing bearing support between the shear adapter and the motor hub;
an auxiliary bearing providing bearing support between the shear adapter and the drive shaft; and
a shear pin interconnecting the shear adapter and the drive shaft whereby rotation of the rotor carrier is transmitted to the drive shaft and wherein breakage of the shear pin disconnects the rotor carrier and the shear adapter from the drive shaft allowing the drive shaft to freewheel relative to the rotor carrier and the shear adapter.

8. The electric drive system of claim 7, wherein, in at least one of the plurality of electric motors, the primary bearing and the auxiliary bearing are arranged in series along the axis.

9. The electric drive system of claim 7, wherein, in at least one of the plurality of electric motors, the primary bearing and the auxiliary bearing are arranged radially relative to the axis.

10. The electric drive system of claim 7, wherein the shear adapter is an annular member having a first axial section and a second axial section, wherein the first axial section and the second axial sections have different diameters.

11. The electric drive system of claim 10, wherein the primary bearing is in connection with the motor hub and the first axial section and the auxiliary bearing is in connection with the drive shaft and the second axial section.

12. The electric drive system of claim 7, wherein:
the primary bearing and the auxiliary bearing are axially aligned with one another relative to the drive shaft; and
the primary bearing is in contact with one side of the shear adapter and the auxiliary bearing is in contact with an opposite side of the shear adapter.

13. The electric motor of claim 1, wherein the shear adapter is an annular member having a first axial section and a second axial section, wherein the first axial section and the second axial sections have different diameters.

14. The electric motor of claim 13, wherein the primary bearing is in connection with the motor hub and the first axial section and the auxiliary bearing is in connection with the drive shaft and the second axial section.

15. The electric motor of claim 1, wherein:
the primary bearing and the auxiliary bearing are axially aligned with one another relative to the drive shaft; and
the primary bearing is in contact with one side of the shear adapter and the auxiliary bearing is in contact with an opposite side of the shear adapter.

* * * * *

UNITED STATES PATENT AND TRADEMARK OFFICE
CERTIFICATE OF CORRECTION

PATENT NO. : 11,722,033 B2
APPLICATION NO. : 17/410519
DATED : August 8, 2023
INVENTOR(S) : Grant Michael Beall et al.

It is certified that error appears in the above-identified patent and that said Letters Patent is hereby corrected as shown below:

In the Claims

Claim 7, Column 7, Lines 39-40   Replace "a shear adapter fixed to the rotor carrier and extending around at least a portion of the common drive shaft;" with -- a shear adapter fixed to the rotor carrier and extending around a portion of the common drive shaft; --

Signed and Sealed this
Sixteenth Day of April, 2024

Katherine Kelly Vidal
*Director of the United States Patent and Trademark Office*